(12) United States Patent
Zeng et al.

(10) Patent No.: US 12,545,208 B2
(45) Date of Patent: Feb. 10, 2026

(54) COMPONENT FOR VEHICLE INTERIOR (71) Applicant: Shanghai Yanfeng Jinqiao Automotive Trim Systems Co., LTD., Novi, MI (US)

(72) Inventors: Tairen Zeng, Shanghai (CN); Yuhua Chen, Shanghai (CN); Haitao Bu, Shanghai (CN)

(73) Assignee: Shanghai Yanfeng Jinqiao Automotive Trim Systems Co., LTD., Novi, MI (US)

( * ) Notice: Subject to any disclaimer, the term of this patent is extended or adjusted under 35 U.S.C. 154(b) by 0 days.

(21) Appl. No.: 19/044,026

(22) Filed: Feb. 3, 2025

(65) Prior Publication Data

US 2025/0178556 A1 Jun. 5, 2025

Related U.S. Application Data (63) Continuation-in-part of application No. PCT/CN2023/111065, filed on Aug. 3, 2023.

(30) Foreign Application Priority Data

Aug. 4, 2022 (CN) .......................... 202210933473.1

(51) Int. Cl.
*B60R 21/21* (2011.01)
(52) U.S. Cl.
CPC .................... *B60R 21/21* (2013.01)
(58) Field of Classification Search
CPC .. B60R 21/2165; B60R 21/205; B60R 21/215
See application file for complete search history.

(56) References Cited

U.S. PATENT DOCUMENTS 5,393,089 A * 2/1995 Pakulsky .............. B60R 21/215
280/732
5,639,115 A * 6/1997 Kelley ................ B60R 21/2165
280/732

(Continued)

FOREIGN PATENT DOCUMENTS

CN 1915713 A 2/2007
CN 109306563 A 2/2019

(Continued)

OTHER PUBLICATIONS

Extended European Search Report for European Application No. 23849505.5 dates Nov. 26, 2025, 7 pages.

*Primary Examiner* — Nicole T Verley
(74) *Attorney, Agent, or Firm* — Amin, Turocy & Watson, LLP (57) ABSTRACT

A component for a vehicle interior configured to facilitate deployment of an airbag is disclosed. The component may comprise a composite structure comprising an injection molded structure/framework with a mesh insert/fabric within a panel and a door panel. The structure may comprise a feature configured to retain the mesh insert. The feature may comprise a set of ribs formed into the mesh insert. A resin feature may comprise a reinforcing rib adjacent to the recess to facilitate binding between the mesh fabric and the door panel. The door panel may comprise a recess provided between the hinge area and the feature to facilitate bonding of the mesh insert. The feature may comprise a rib formed into the mesh insert at the recess. The mesh may comprise a set of rings configured to facilitate absorption of energy during deployment of the airbag.

20 Claims, 7 Drawing Sheets

(56) References Cited

U.S. PATENT DOCUMENTS

| | | | |
|---|---|---|---|
| 5,901,976 A | 5/1999 | Kreuzer et al. | |
| 5,975,563 A | 11/1999 | Gallagher et al. | |
| 11,390,237 B2 * | 7/2022 | Kobayashi | B60R 21/215 |
| 2002/0000711 A1 | 1/2002 | Schmidt et al. | |
| 2002/0014759 A1 | 2/2002 | Desprez | |
| 2004/0043683 A1 * | 3/2004 | Muench | B29C 43/184 |
| | | | 442/30 |
| 2005/0127642 A1 * | 6/2005 | Weissert | B60R 21/2165 |
| | | | 280/728.3 |
| 2006/0043701 A1 * | 3/2006 | Zagrodnicki | B60R 21/215 |
| | | | 280/728.3 |
| 2006/0255569 A1 * | 11/2006 | Weissert | B60R 21/216 |
| | | | 280/732 |
| 2012/0104732 A1 * | 5/2012 | An | B60R 21/215 |
| | | | 280/728.3 |
| 2014/0375026 A1 | 12/2014 | Schupbach | |
| 2014/0375027 A1 * | 12/2014 | Baudart | B60R 21/2165 |
| | | | 280/728.3 |
| 2016/0167612 A1 * | 6/2016 | Svensson | B29C 45/1418 |
| | | | 264/259 |
| 2018/0194319 A1 | 7/2018 | Lesnik et al. | |
| 2022/0153220 A1 * | 5/2022 | Stroebe | B60R 21/215 |
| 2025/0108772 A1 * | 4/2025 | Stroebe | B60R 21/2165 |

FOREIGN PATENT DOCUMENTS

| | | | | |
|---|---|---|---|---|
| CN | 208813152 U | | 5/2019 | |
| CN | 209079401 U | | 7/2019 | |
| CN | 209813910 U | | 12/2019 | |
| CN | 111071196 A | | 4/2020 | |
| CN | 112292289 A | * | 1/2021 | B29C 37/0057 |
| CN | 112941694 A | | 6/2021 | |
| CN | 215706181 U | | 2/2022 | |
| CN | 115285060 A | | 11/2022 | |
| DE | 10223302 A1 | | 12/2003 | |
| DE | 102011051298 A1 | * | 5/2012 | B60R 21/215 |
| DE | 102013017382 A1 | | 4/2015 | |
| EP | 1754635 A1 | * | 2/2007 | B29C 45/14065 |
| EP | 3068664 B1 | * | 8/2018 | B60R 21/205 |
| JP | 2005199766 A | | 7/2005 | |
| WO | WO-2023147086 A2 | * | 8/2023 | B60R 21/2165 |
| WO | WO-2024015296 A1 | * | 1/2024 | B60R 13/02 |

* cited by examiner

COMPONENT FOR VEHICLE INTERIOR

CROSS-REFERENCE TO RELATED APPLICATIONS

The present application is a continuation-in-part of PCT/International Patent Application No. PCT/CN2023/111065 titled "Airbag Door Structure, Vehicle Interior Component, and Manufacturing Method" filed Aug. 3, 2023, which claims the benefit of Chinese Patent Application No. 202210933473.1 titled "Airbag Door Structure" filed Aug. 4, 2022.

The present application claims priority to and incorporates by reference in full the following patent applications: (1) Chinese Patent Application No. 202210933473.1 titled "Airbag Door Structure" filed Aug. 4, 2022; (2) PCT/International Patent Application No. PCT/CN2023/111065 titled "Airbag Door Structure, Vehicle Interior Component, and Manufacturing Method" filed Aug. 3, 2023.

FIELD

The present invention relates to a component for a vehicle interior.

The present invention also relates to a component for a vehicle interior configured for deployment of an airbag.

The present invention relates to a component for a vehicle interior comprising an airbag door structure configured to facilitate deployment of an airbag.

BACKGROUND

It is known to provide a component for a vehicle interior such as an instrument panel configured to facilitate deployment of an airbag from an airbag module.

It would be advantageous to provide an improved component comprising an airbag door structure comprising an embedded inserted injection molding structure of a mesh fabric and a framework.

It would be advantageous to provide an improved component comprising an airbag door structure comprising an embedded inserted injection molding structure of a mesh fabric and a framework to provide reduced cost.

It would be advantageous to provide an improved component comprising an airbag door structure comprising an embedded inserted injection molding structure of a mesh fabric and a framework to overcome problems of poor combination of the mesh fabric and the airbag door such as cracking/breaking of the mesh fabric and/or structure/border of the airbag door during deployment and/or failure point of detachment between an airbag door cover and a mesh fabric.

It would be advantageous to provide an improved component comprising an airbag door structure comprising an embedded inserted injection molding structure of a mesh fabric and a framework to reduce the possibility of ignition/deterioration at deployment.

It would be advantageous to provide an improved component comprising an airbag door structure comprising an embedded inserted injection molding structure of a mesh fabric and a framework to provide improved energy-absorption to ensure the integrity of the airbag door cover and safety margin at deployment.

SUMMARY

The present invention relates to a component for a vehicle interior configured to facilitate deployment of an airbag through an opening comprising a composite structure comprising a base panel and a door panel and a mesh; the composite structure may be configured to provide a hinge area between the base panel and the door panel; the composite structure may be configured to facilitate deployment of the airbag to form the opening at the door panel. The composite structure may comprise an injection molded structure comprising the base panel and the door panel. The mesh may comprise a mesh insert provided in the injection molded structure. The mesh may comprise a mesh insert within the base panel and the door panel. The mesh insert may comprise a mesh fabric. The injection molded structure may comprise a framework. The hinge area may comprise the mesh insert. The composite structure may comprise a feature configured to retain the mesh insert within the composite structure. The feature may comprise a rib. The rib may comprise a set of ribs and/or a formed rib and/or a set of formed ribs. The feature may comprise a set of ribs formed into the mesh insert. The mesh insert may comprise a mesh fabric; the feature may comprise a resin feature formed through the mesh fabric during injection molding of the composite structure; the resin feature may comprise a reinforcing rib at an outer surface of the mesh fabric adjacent to the recess to facilitate binding between the mesh fabric and the door panel. The door panel may comprise a recess provided between the hinge area and the feature to facilitate bonding of the mesh insert at the recess. The feature may comprise at least one rib formed into the mesh insert at the recess. The recess may be configured to extend parallel to the hinge area and/or the recess may comprise a wave-shaped recess. The mesh may comprise a set of rings at the base panel configured to facilitate absorption of energy during deployment of the airbag. The set of rings may comprise a set of threaded rings in series. The mesh insert may comprise a mesh fabric comprising a first region adjacent to the hinge area and a second region located apart from the hinge area; the mesh fabric at the first region may comprise a first weft density and the mesh fabric at the second region may comprise a second weft density; the first weft density may be less than the second weft density. The mesh insert may comprise a mesh fabric; the composite structure may comprise a resin feature formed through the mesh fabric during injection molding of resin to form the injection molded structure of the composite structure; the resin feature may comprise a reinforcing rib at an outer surface of the mesh fabric adjacent to a recess to facilitate bonding between the mesh fabric and the door panel; the mesh fabric may be provided within the base panel; the base panel may comprise a set of features to facilitate bonding between the mesh fabric and the base panel.

The present invention relates to an airbag door structure comprising mesh/mesh fabric connected and fixed on an inner side of a framework/frame facing an airbag; the framework/frame may comprise a door cover and a side panel connected by a hinge, the door cover is provided with a first rib/rib structure and at least one recess formed in the bottom surface of the door cover close to the hinge; the recess is located between the hinge and the first rib/rib structure so as to improve the force of binding between the mesh/mesh fabric in the recess and the door cover and limit the mesh/mesh fabric located at the first rib/rib structure to a bottom of the first rib/rib structure; the mesh/mesh fabric connected to the side panel is provided with a first ring and a second ring connected in series, so as to facilitate absorption of airbag impact energy by inserted injection molding of both rings mesh/mesh fabric. The recess is configured to extend parallel to the hinge. The recess may comprise a continuously extending wave groove and/or discrete semi-circular arc segments. The minimum distance of the recess from the hinge is configured to be 3 to 5 mm and a distance of the first rib/rib structure from the hinge is configured to be 10 to 30 mm. The mesh/mesh fabric connected on the door cover may comprise sectionalized weft densities. The mesh/mesh fabric connected on the door cover may comprise a first region located close to the hinge and a second region located away from the hinge, the mesh/mesh fabric of the first region having a first weft density and the mesh/mesh fabric of the second region having a second weft density and the first weft density is less than the second weft density. The first weft density is equal to or less than 3 threads per 10 mm. The second weft density is 5 to 7 threads per 10 mm. The door cover may comprise a first rib/rib structure located in the first region. The mesh/mesh fabric is connected to the framework/frame by inserted injection molding and a part of resin permeates through the mesh/mesh fabric during the inserted injection molding, thereby forming a reinforcing rib at an outer surface of the mesh/mesh fabric corresponding to the recess to improve the force of binding between the mesh/mesh fabric and the door cover.

The present invention relates to a vehicle interior component comprising an instrument panel on which an airbag door structure is mounted and a mesh/mesh fabric is connected and fixed on an inner side of a framework/frame facing an airbag; the framework/frame comprising a door cover and a side panel connected by a hinge; the door cover forms at least one recess on a bottom surface close to the hinge to improve the force of binding between the mesh/mesh fabric in the recess and the door cover. The recess is configured to extend parallel to the hinge. The recess is a continuously extending wave groove. The recess may comprise discrete semi-circular arc segments. The minimum distance of the recess from the hinge is 3 to 5 mm. The door cover may comprise at least a first region located close to the hinge and a second region located away from the hinge. The mesh/mesh fabric connected on the door cover may comprise sectionalized weft densities. The mesh/mesh fabric connected on the door cover may comprise a first region located close to the hinge and a second region located away from the hinge, the mesh/mesh fabric of the first region having a first weft density and the mesh/mesh fabric of the second region having a second weft density and the first weft density is less than the second weft density. The first weft density is equal to or less than 3 threads per 10 mm. The second weft density is 5 to 7 threads per 10 mm. The door cover may comprise at least one rib/rib structure. The rib/rib structure is formed on a bottom surface close to the hinge. The rib/rib structure is located in the first region. The distance between the rib/rib structure and the hinge is 10 to 30 mm. The mesh/mesh fabric is connected to the side panel and may comprise at least one ring to facilitate absorption of airbag impact energy. The mesh/mesh fabric is connected to the side panel and may comprise a first ring and a second ring connected in series with the first ring to facilitate absorption of airbag impact energy. The mesh/mesh fabric is connected to the framework/frame by inserted injection molding; a part of resin permeates through the mesh/mesh fabric during the inserted injection molding to form at least one reinforcing rib at an outer surface of the mesh/mesh fabric corresponding to the recess to improve the force of binding between the mesh/mesh fabric and the door cover. The door cover is provided with a first rib/rib structure formed on a bottom surface close to the hinge; the recess is between the hinge and the first rib/rib structure so as to improve the force of binding between the mesh/mesh fabric in the recess and the door cover. The door cover is provided with a first rib/rib structure formed on a bottom surface close to the hinge and the recess is located between the hinge and the first rib/rib structure to limit the mesh/mesh fabric located at the first rib/rib structure to a bottom of the first rib/rib structure. The mesh/mesh fabric is connected to the framework/frame by inserted injection molding; a part of resin permeates through the mesh/mesh fabric during the inserted injection molding to form a reinforcing rib at an outer surface of the mesh/mesh fabric corresponding to the recess to improve the force of binding between the mesh/mesh fabric and the door cover.

The present invention relates to a method for manufacturing a vehicle interior component for a vehicle interior component comprising an instrument panel with an airbag door structure comprising the steps of forming a framework/frame, a door cover, at least one reinforcing rib and a recess and connecting mesh/mesh fabric to the framework/frame by inserted injection molding; a part of resin may permeate through the mesh/mesh fabric during the inserted injection molding to form a reinforcing rib at an outer surface of the mesh/mesh fabric corresponding to the recess to improve the force of binding between the mesh/mesh fabric and the door cover. The mesh/mesh fabric is formed on a side panel of the framework/frame. The mesh/mesh fabric may comprise a first ring and a second ring connected in series by inserted injection molding of both rings of the mesh/mesh fabric.

The present invention relates to an airbag door structure comprising a mesh fabric connected and fixed on an inner side of a framework facing an airbag; the framework comprising a door cover and a side panel which are connected by a hinge, the door cover may be provided with a first pressing rib, and at least one recess formed in the bottom surface of the door cover close to the hinge; the recess being located between the hinge and the first pressing rib so as to improve the force of binding between the mesh fabric in the recess and the door cover and limit the mesh fabric located at the first pressing rib to a bottom of the first pressing rib; the mesh fabric connected to the side panel may be provided with a first lifting ring and a second lifting ring which are connected in series, so as to facilitate absorption of airbag impact energy by inserted injection molding of the double-lifting-ring mesh fabric. The recess may extend parallel to the hinge. The recess may comprise a continuously extending wave groove or may be provided by discrete semi-circular arc segments. The minimum distance of the recess from the hinge may be set to 3 to 5 mm, and a distance of the first pressing rib from the hinge may be set to 10 to 30 mm. The mesh fabric connected on the door cover may have a weft density adjusted in segment. The mesh fabric connected on the door cover comprises a first region close to the hinge and a second region away from the hinge, the mesh fabric of the first region having a first weft density and the mesh fabric of the second region having a second weft density, the first weft density being less than the second weft density. The first weft density may be 3 threads per 10 mm or less. The second weft density may be 5 to 7 threads per 10 mm. The door cover may be provided with a first pressing rib located in the first region. The mesh fabric may be connected to the framework by inserted injection molding, and a part of resin penetrates through the mesh fabric during the inserted injection molding to form a reinforcing rib at an outer surface of the mesh fabric corresponding to the recess to improve the force of binding between the mesh fabric and the door cover.

The present invention relates to a vehicle interior component comprising an instrument panel on which an airbag door structure may be mounted, a mesh fabric may be connected and fixed on an inner side of a framework facing an airbag; the framework comprising a door cover and a side panel which are connected by a hinge, the door cover forms at least one recess on a bottom surface close to the hinge to improve the force of binding between the mesh fabric in the recess and the door cover. The recess extends parallel to the hinge. The recess may be a continuously extending wave groove. The recess may be provided by discrete semi-circular arc segments. The minimum distance of the recess from the hinge may be 3 to 5 mm. The door cover comprises at least a first region close to the hinge and a second region away from the hinge. The mesh fabric connected on the door cover may have a weft density adjusted in segment. The mesh fabric connected on the door cover comprises a first region close to the hinge and a second region away from the hinge, the mesh fabric of the first region having a first weft density and the mesh fabric of the second region having a second weft density, the first weft density being less than the second weft density. The first weft density may be 3 threads per 10 mm or less. The second weft density may be 5 to 7 threads per 10 mm. The door cover may have at least one pressing rib. The pressing rib may be formed on a bottom surface close to the hinge. The pressing rib may be located in the first region. The distance between the pressing rib and the hinge may be 10 to 30 mm. The mesh fabric may be connected to the side panel and may have at least one lifting ring to facilitate absorption of airbag impact energy. The mesh fabric may be connected to the side panel and may have a first lifting ring and a second lifting ring in series with the first lifting ring to facilitate absorption of airbag impact energy. The mesh fabric may be connected to the framework by inserted injection molding, and a part of resin penetrates through the mesh fabric during the inserted injection molding, thereby forming at least one reinforcing rib at an outer surface of the mesh fabric corresponding to the recess to improve the force of binding between the mesh fabric and the door cover. The door cover may be provided with a first pressing rib formed on a bottom surface close to the hinge, and the recess may be between the hinge and the first pressing rib so as to improve the force of binding between the mesh fabric in the recess and the door cover. The door cover may be provided with a first pressing rib formed on a bottom surface close to the hinge; and the recess may be between the hinge and the first pressing rib to limit the mesh fabric located at the first pressing rib to a bottom of the first pressing rib. The mesh fabric may be connected to the framework by inserted injection molding, and a part of resin penetrates through the mesh fabric during the inserted injection molding, thereby forming a reinforcing rib at an outer surface of the mesh fabric corresponding to the recess to improve the force of binding between the mesh fabric and the door cover.

The present invention relates to a method for manufacturing a vehicle interior component according to the invention comprising an instrument panel on which an airbag door structure may be mounted comprises: forming a framework, a door cover, at least one reinforcing rib and a recess; connecting a mesh fabric to the framework by inserted injection molding; and a part of resin penetrating through the mesh fabric during the inserted injection molding, thereby forming a reinforcing rib at an outer surface of the mesh fabric corresponding to the recess to improve the force of binding between the mesh fabric and the door cover. A mesh fabric may be formed on a side panel of the framework. A mesh fabric may be injection molded from a double-lifting-ring mesh fabric having a first lifting ring and a second lifting ring in series.

The present invention relates to an airbag door structure through assembly of the recess on the door cover and the inserted injection molding of the double-lifting-ring mesh fabric to avoid the detachment of the mesh fabric from the airbag door during deployment as possible to improve the safety factor of ignition and a first-pass yield, to save the development cost, and to save the experimental cost of batch ignition, to solve the most severe ignition problem of the airbag door without increasing the cost, and to let the instrument panel ignition pass once.

DESCRIPTION

Figure 1A:
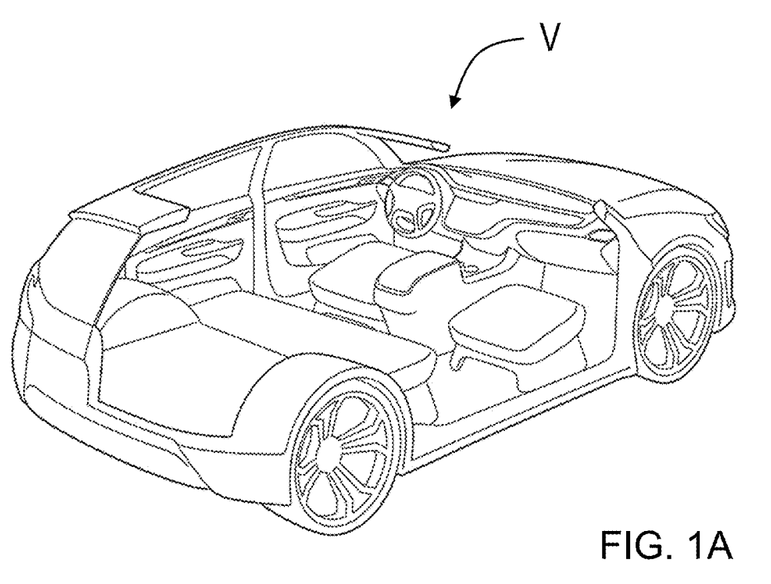
FIG. 1A is a schematic view of a vehicle according to an exemplary embodiment.
Figure 1B:
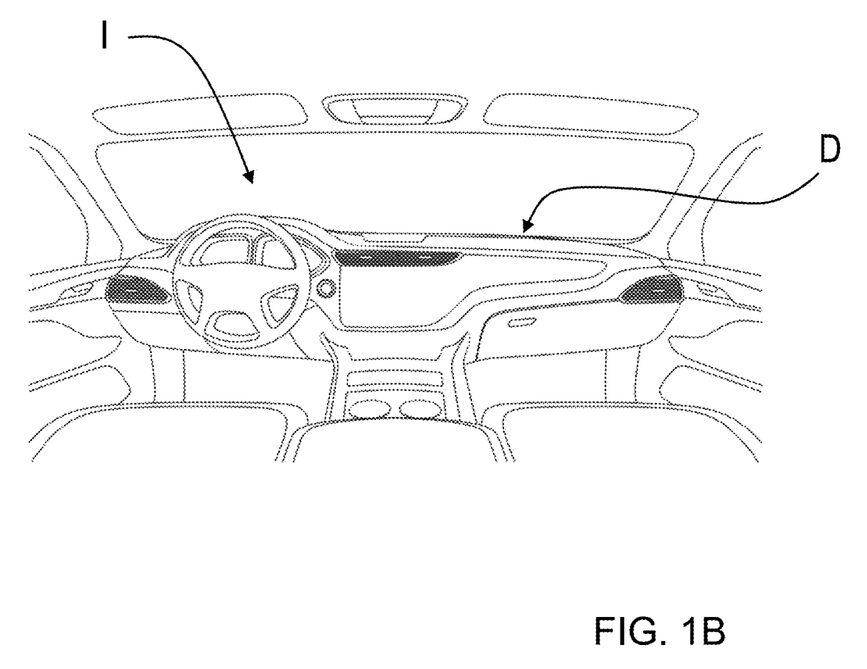
FIG. 1B is a schematic view of a component shown as an instrument panel providing an airbag door structure according to an exemplary embodiment.
Figure 1C:
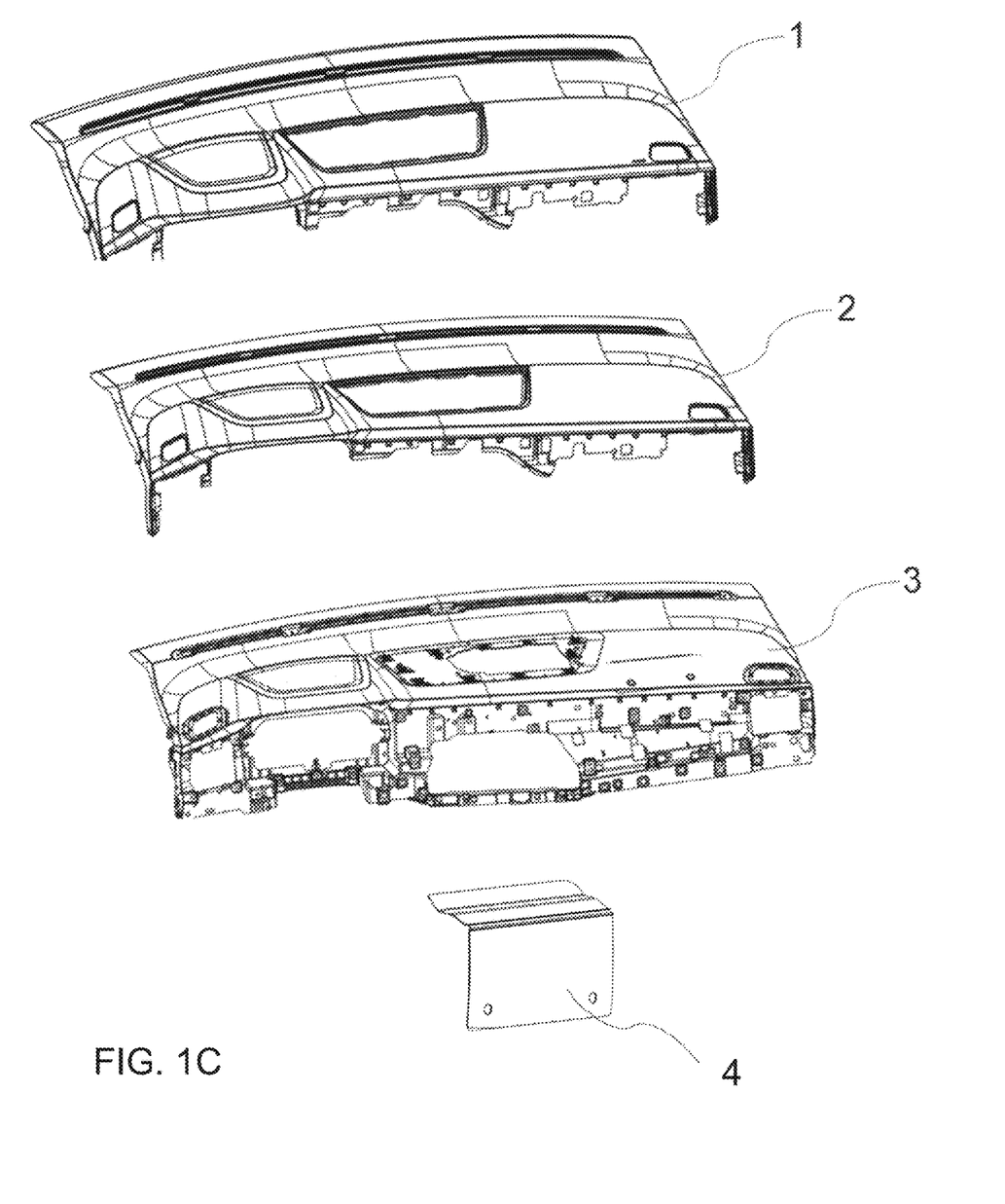
FIG. 1C is a partial exploded schematic view of the instrument panel according to an exemplary embodiment.

According to an exemplary embodiment s shown schematically in FIGS. 1A-1C, a component such as an mounted on an instrument panel D comprising an airbag structure may be provided for the interior I of a vehicle V; the component D may comprise a skin layer 1, a foamed layer 2, a framework 3, and a mesh fabric 4; the mesh fabric may be provided/fixed at an airbag door region of the framework 3; the foamed layer 2 may be provided/covered above the framework 3 to provide a tactile effect such as soft touch for the instrument panel D; and the skin layer 1 may be provided/covered above the foamed layer 2 to provide visual effect/appearance of the instrument panel D. As indicated schematically, upon an impact event such as a collision, an airbag may be deployed from an airbag module from the component shown as instrument panel D to provide an opening at/below the mesh fabric 4 into the vehicle interior for protection of an occupant.

Figure 2A:
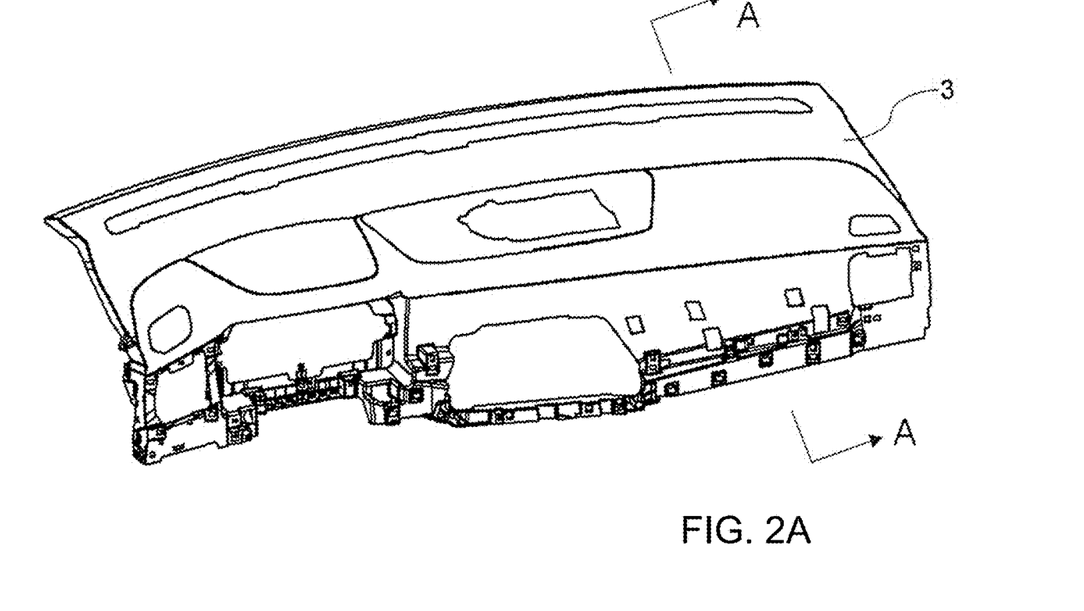
FIG. 2A is a schematic view of the airbag door structure with framework and mesh fabric according to an exemplary embodiment.
Figure 2B:
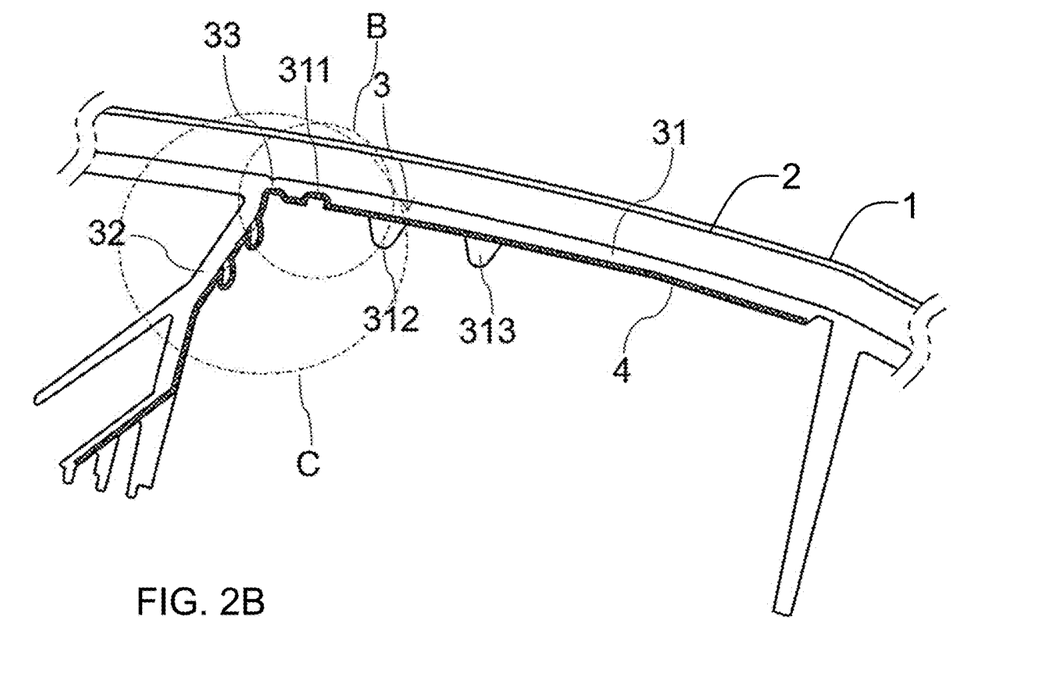
FIG. 2B is a cross-sectional schematic of the airbag door structure with framework and mesh fabric according to an exemplary embodiment.

As shown schematically in FIGS. 2A-2B, the mesh fabric 4 of the airbag door structure is connected and fixed on the inner side of the framework 3 facing the airbag. As indicated schematically, the framework 3 comprises an integrally formed door cover 31 and a side panel 32, the junction of which is formed as a hinge 33, and the door cover 31 is positioned in the opening channel of the airbag to open around the hinge 33 in the event of an ignition.

Figure 3:
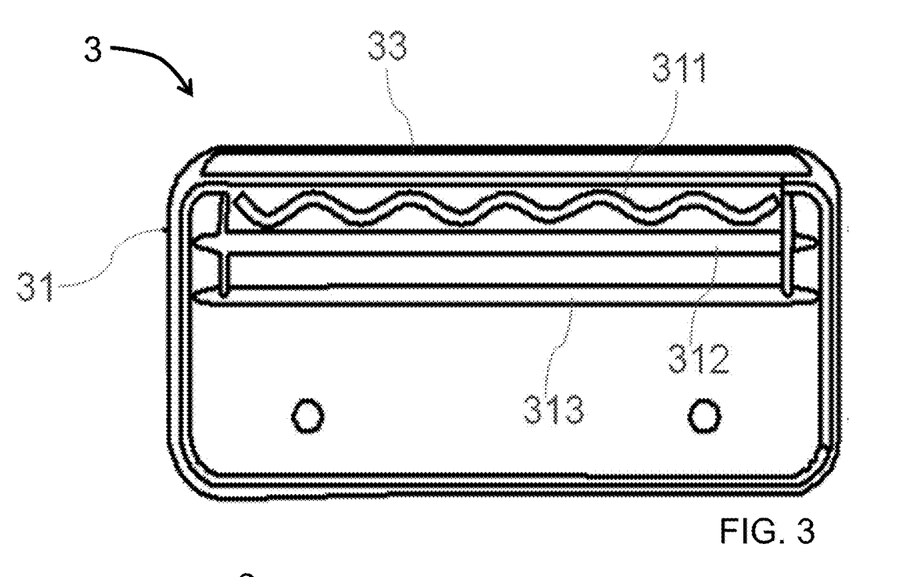
FIG. 3 is a bottom schematic view of a cover panel of the airbag door structure with framework and mesh fabric according to an exemplary embodiment.

As shown schematically in FIGS. 2B and 3, at least one recess 311 is formed in the bottom surface of the door cover 31 close to the hinge 33, thereby improving the bonding force between the mesh fabric 4 and the door cover 31. As indicated schematically, the recess 311 is a wave groove extending parallel to the hinge 33. As indicated schematically, the waveforms may comprise various forms (in addition to form and shapes and/or to the continuous extension shown schematically in the FIGURES); example forms including with the recess may comprise discrete semi-circular arc segments. As indicated schematically, the door cover 31 is provided with a set of ribs shown as a first pressing rib 312 and a second pressing rib 313; both ribs may extend parallel to the hinge 33 for pressing the mesh fabric 4 against the framework 3; a recess 311 located between the hinge 33 and the ribs show as first pressing rib 312 prevent the first pressing rib 312 from being damaged (e.g. prevent rib from puncturing the airbag after rupture during airbag deployment as would increase a potential safety hazard). As indicated schematically, the recess 311 can not only improve the bonding force between the mesh fabric 4 in the recess 311 and the door cover 31, but also confine the mesh fabric 4 at the first pressing ribs 312 to the bottom of the first pressing ribs 312. As indicated schematically, the recess 311 at mesh fabric 4 may conform to the door cover 31 during the injection molding of the first pressing rib 312 (rather than float to a position at middle of the rib which float may reduce strength and increase potential risk of puncturing the airbag after rupture). According to an exemplary embodiment, the minimum distance of the recess 311 from the hinge 33 is between 3 and 5 mm and the distance of the first pressing rib 312 from the hinge 33 is between 10 and 30 mm. According to an exemplary embodiment, the depth of the recess 311 is between 1 and 2 mm. As indicated schematically, the depth of the recess 311 is 1.5 mm. According to an exemplary embodiment, the width of the recess 311 is between 2 and 4 mm. As indicated schematically, the width of the recess 311 is 3 mm. By disposing the recess 311, the contact surface between the door cover 31 and the mesh fabric 4 is increased, the peeling force between the mesh fabric 4 and the door cover 31 is increased, and the embedding length of the mesh fabric 4 is ensured to be consistent. The mesh fabric 4 is connected to the framework 3 by injection molding (e.g. as a insert to the mold); during the injection molding, a part of the resin may project/penetrate through the mesh fabric 4 to form a reinforcing rib at the outer surface of the mesh fabric corresponding to the recess 311, so as to improve the bonding force between the mesh fabric 4 and the door cover 31. As indicated schematically, as shown schematically in FIG. 4, the resin may exude/flow at the corners of the recess 311 with the reinforcing ribs are provided to increase strength/bonding (e.g. increasing the peeling force to separate). As indicated schematically, the bonding (e.g. peeling energy) of the mesh fabric 4 and the door cover 31 may be increase (e.g. by about 35.1 percent as indicated schematically). As indicated schematically, the form of the first pressing rib 312 is maintained (e.g. preventing damage and retaining/increasing the design safety margin).

Figure 5:
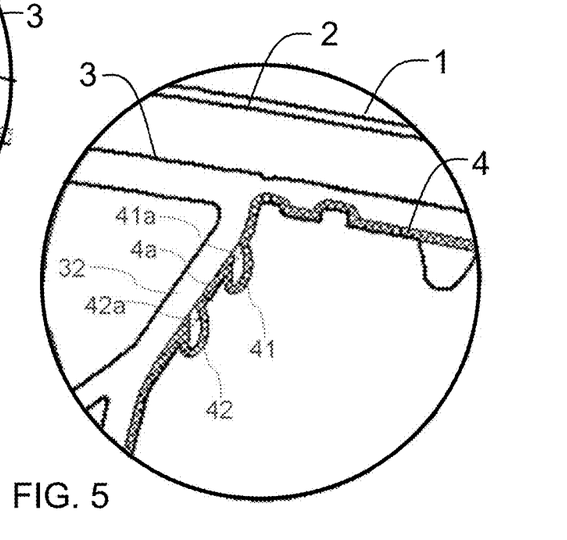
FIG. 5 is an enlarged schematic view of a region of the airbag door structure with framework and mesh fabric according to an exemplary embodiment.

As shown schematically in FIG. 5, the mesh fabric 4 connected to the side panel 32 may have a loops/rings shown as a first lifting ring 41 and a second lifting ring 42; loops/rings as indicated are connected in series; the a double-lifting-ring mesh fabric is connected to the framework 3 by injection molding (e.g. injection molding with an insert) so as to facilitate a structure intended to provide more absorption of impact energy of the airbag when the airbag is deployed; damage to the first pressing rib 312 is prevented and as would allow the mesh fabric 4 to be detached from the door cover 31. As indicated schematically, by optimizing one large lifting ring of the same warp thread to two small lifting rings (two lifting rings of the same warp thread, with the lifting rings facing in the same direction, ensuring both a constant length of the functional segment and a uniform lifting ring), the energy absorption of the mesh fabric is improved (e.g. indicating two/double rings/functional segment as to improve performance over a single ring/functional segment). As indicated schematically, the deploying energy absorption process of the functional zone of mesh fabric 4 of the invention comprises three stages. The first stage is the breaking of the warp thread 41a and the subsequent deploying of the first lifting ring 41. The second stage is the peeling of the intermediate section 4a between the first lifting ring 41 and the second lifting ring 42 from the side panel 32. The third stage is the breaking of the warp thread 42a and the subsequent deploying of the second lifting ring 42, and the energy absorption effect is greatly improved. As indicated schematically, the energy absorption is increased (e.g. by a multiple) as comparing the double-ring and single-ring for the mesh fabric; and the deployment stability coefficient is improved (e.g. double-ring significantly improved over single-ring).

Figure 6A:
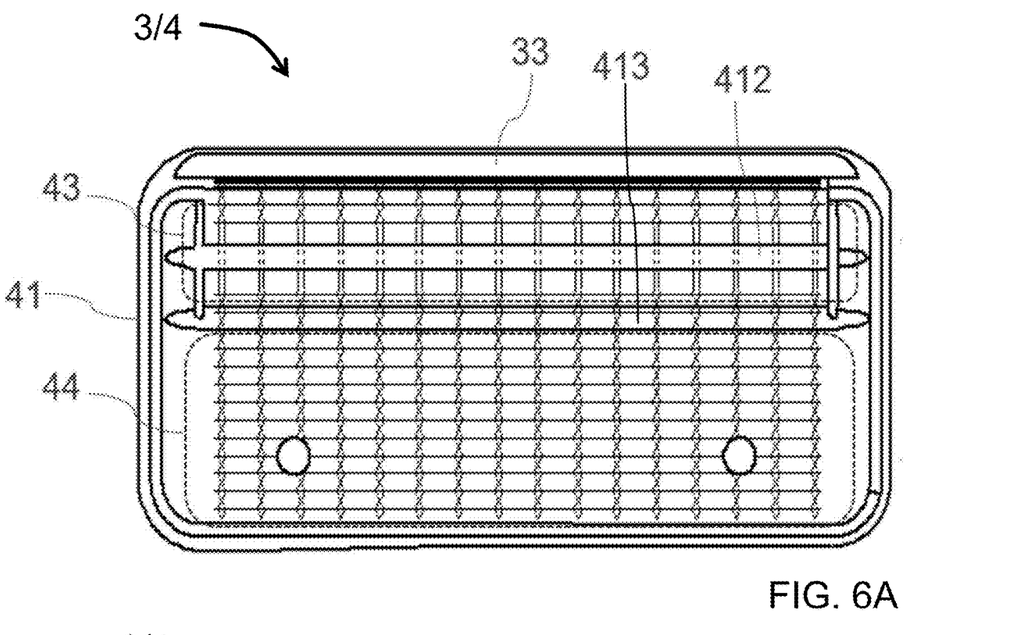
FIGS. 6A and 6B are bottom schematic views of a cover panel region of the airbag door structure with framework and mesh fabric according to an exemplary embodiment.
Figure 6B:
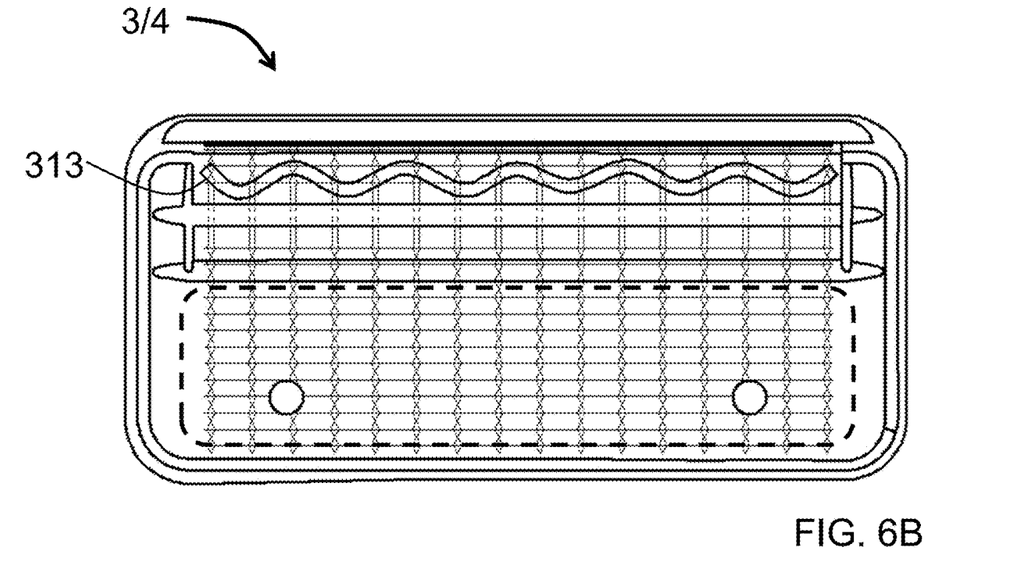
Figure 7:
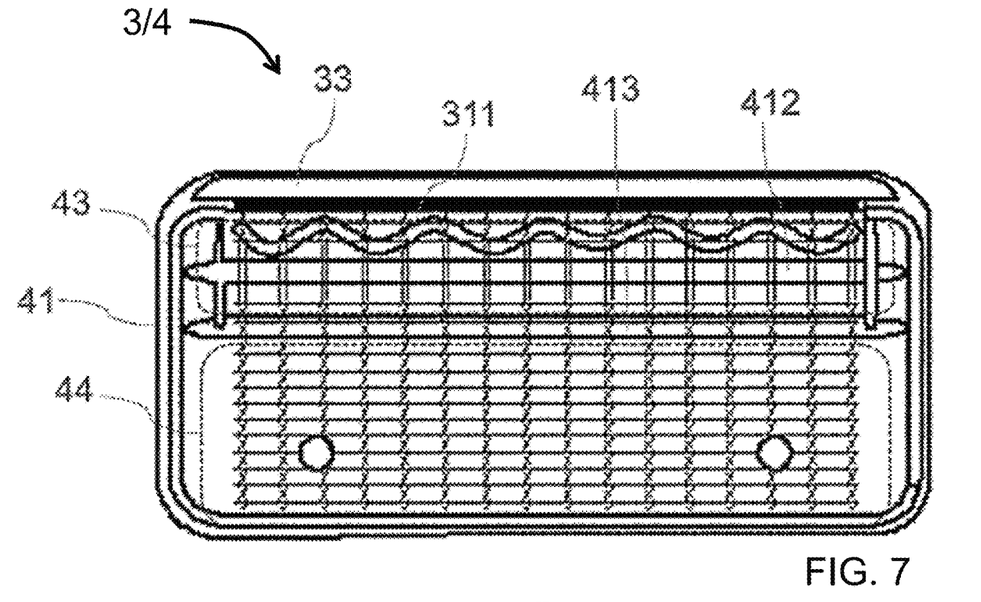
FIG. 7 is a bottom schematic view of a cover panel region of the airbag door structure with framework and mesh fabric according to an exemplary embodiment.

As shown schematically in FIGS. 6A-6B and 7, the mesh fabric 4 connected on the door cover 31 comprises a first region 43 and a second region 44, the first region 43 is close to the hinge 33, preferably 15 to 20 mm from the hinge 33, and the second region 44 is away from the hinge 33. As indicated schematically, the mesh fabric 4 of the first region 43 may have a first weft density and the mesh fabric 4 of the second region 44 may have a second weft density, the first weft density being less than the second weft density. As indicated schematically, the first weft density is 3 threads per 10 mm or less, the second weft density is 5 to 7 threads per 10 mm and the preferred density is 6 threads per 10 mm. As indicated schematically, such a weft density adjusted in segment can both increase the bonding force between the mesh fabric 4 of the first region 43 to the door cover 31 and ensure the self-strength of the mesh fabric 4 of the second region 44, with respect to the same weft density used for the mesh fabric (e.g. conventional arrangements, etc.). As indicated schematically, the number of weft knitting of the mesh fabric 4 in the first region 43 is reduced, and after the density is reduced, the molten resin forming the framework 3 in the inserted injection molding process penetrates through the mesh fabric 4 at the recess edge portion, so that ribs similar to the shape of the recess 311 are formed on the side of the mesh fabric 4 away from the door cover 31, and these ribs ca further improve the bonding force between the mesh fabric 4 and the door cover 31; the number of weft knitting of the mesh fabric 4 in the second region 44 ensures the stiffness of the mesh fabric 4 at the time of injection molding. As indicated schematically, the first pressing rib 412 is located in the first region 43, thereby preventing the first pressing rib 312 from being damaged and preventing the mesh fabric 4 from being detached from the door cover 31. As indicated schematically in FIG. 6B, adhesive/bonding force between the mesh fabric and the door can be increased by providing a groove on the door near the hinge.

According to an exemplary embodiment as shown schematically in FIGS. 8 and 8A-8C, the component D provided by the composite structure is configured to deploy an airbag AB through an airbag door ABD.

Figure 9A:
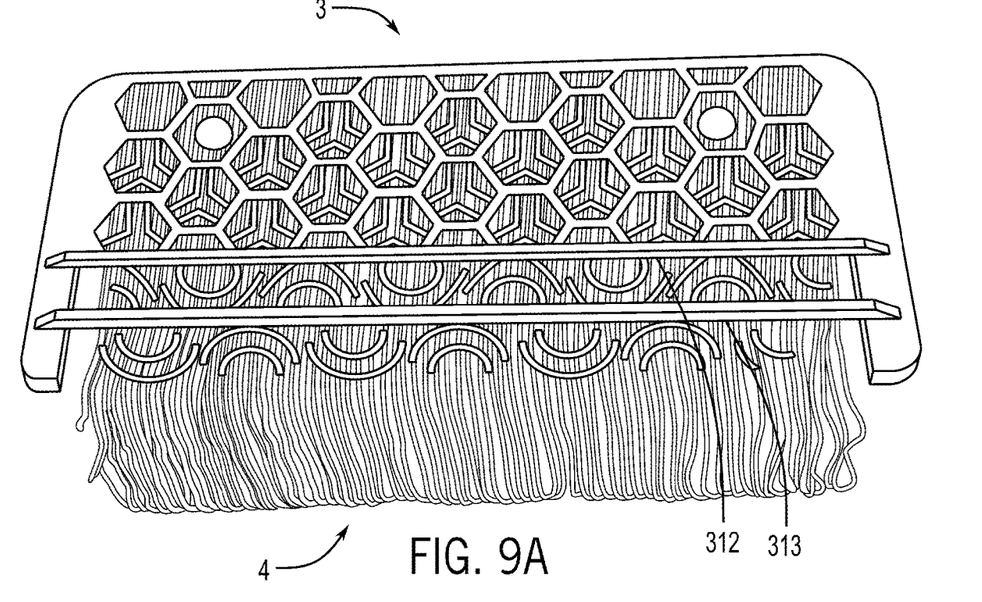
FIG. 9A is a schematic view of a cover panel with mesh fabric for the airbag door structure with framework according to an exemplary embodiment.

As indicated schematically in FIGS. 3 and 9A, the component may comprise a cover panel 3 with features/ribs 312 and 313 and mesh fabric 4 for the airbag door structure with framework/carrier or substrate. As indicated schematically in FIGS. 2B, 5 and 9B, the component may comprise mesh fabric 4 with loops/rings 41 and 42 for the airbag door structure with framework.

Exemplary Embodiments—A

According to an exemplary embodiment as shown schematically in FIGS. 1A-1C, 2A-2B, 3, 4, 5, 6A-6B, 7, 8, 8A-8C and 9A-9B, a component for a vehicle interior configured to facilitate deployment of an airbag through an opening may comprise a composite structure comprising a base panel and a door panel and a mesh; the composite structure may be configured to provide a hinge area between the base panel and the door panel; the composite structure may be configured to facilitate deployment of the airbag to form the opening at the door panel. The composite structure may comprise an injection molded structure comprising the base panel and the door panel. The mesh may comprise a mesh insert provided in the injection molded structure. The mesh may comprise a mesh insert within the base panel and the door panel. The mesh insert may comprise a mesh fabric. The injection molded structure may comprise a framework (or carrier, substrate, etc.). The hinge area may comprise the mesh insert. The composite structure may comprise a feature configured to retain the mesh insert within the composite structure. The feature may comprise a rib. The rib may comprise a set of ribs and/or a formed rib and/or a set of formed ribs. feature may comprise a set of ribs formed into the mesh insert. The mesh insert may comprise a mesh fabric; the feature may comprise a resin feature formed through the mesh fabric during injection molding of the composite structure; the resin feature may comprise a reinforcing rib at an outer surface of the mesh fabric adjacent to the recess to facilitate binding between the mesh fabric and the door panel. The door panel may comprise a recess provided between the hinge area and the feature to facilitate bonding of the mesh insert at the recess. The feature may comprise at least one rib formed into the mesh insert at the recess. The recess may be configured to extend parallel to the hinge area and/or the recess may comprise a wave-shaped recess. The mesh may comprise a set of rings at the base panel configured to facilitate absorption of energy during deployment of the airbag. The set of rings may comprise a set of threaded rings in series. The mesh insert may comprise a mesh fabric comprising a first region adjacent to the hinge area and a second region located apart from the hinge area; the mesh fabric at the first region may comprise a first weft density and the mesh fabric at the second region may comprise a second weft density; the first weft density may be less than the second weft density. The mesh insert may comprise a mesh fabric; the composite structure may comprise a resin feature formed through the mesh fabric during injection molding of resin to form the injection molded structure of the composite structure; the resin feature may comprise a reinforcing rib at an outer surface of the mesh fabric adjacent to a recess to facilitate bonding between the mesh fabric and the door panel; the mesh fabric may be provided within the base panel; the base panel may comprise a set of features to facilitate bonding between the mesh fabric and the base panel.

According to an exemplary embodiment as shown schematically in FIGS. 1A-1C, 2A-2B, 3, 4, 5, 6A-6B, 7, 8, 8A-8C and 9A-9B, a component such as an instrument panel for a vehicle interior may comprise a structure such as an airbag door structure comprising a mesh/mesh fabric connected and fixed on an inner side of a framework/frame facing an airbag; the framework/frame may comprise a door cover and a side panel connected by a hinge, the door cover is provided with a first rib/rib structure and at least one recess formed in the bottom surface of the door cover close to the hinge; the recess is located between the hinge and the first rib/rib structure so as to improve the force of binding between the mesh/mesh fabric in the recess and the door cover and limit the mesh/mesh fabric located at the first rib/rib structure to a bottom of the first rib/rib structure; the mesh/mesh fabric connected to the side panel is provided with a first ring and a second ring connected in series, so as to facilitate absorption of airbag impact energy by inserted injection molding of both rings mesh/mesh fabric. The recess is configured to extend parallel to the hinge. The recess may comprise a continuously extending wave groove and/or discrete semi-circular arc segments. The minimum distance of the recess from the hinge is configured to be 3 to 5 mm and a distance of the first rib/rib structure from the hinge is configured to be 10 to 30 mm. The mesh/mesh fabric connected on the door cover may comprise sectionalized weft densities. The mesh/mesh fabric connected on the door cover may comprise a first region located close to the hinge and a second region located away from the hinge, the mesh/mesh fabric of the first region having a first weft density and the mesh/mesh fabric of the second region having a second weft density and the first weft density is less than the second weft density. The first weft density is equal to or less than 3 threads per 10 mm. The second weft density is 5 to 7 threads per 10 mm. The door cover may comprise a first rib/rib structure located in the first region. The mesh/mesh fabric is connected to the framework/frame by inserted injection molding and a part of resin permeates through the mesh/mesh fabric during the inserted injection molding, thereby forming a reinforcing rib at an outer surface of the mesh/mesh fabric corresponding to the recess to improve the force of binding between the mesh/mesh fabric and the door cover.

According to an exemplary embodiment as shown schematically in FIGS. 1A-1C, 2A-2B, 3, 4, 5, 6A-6B, 7, 8, 8A-8C and 9A-9B, a vehicle interior component may comprise an instrument panel on which an airbag door structure is mounted and a mesh/mesh fabric is connected and fixed on an inner side of a framework/frame facing an airbag; the framework/frame comprising a door cover and a side panel connected by a hinge; the door cover forms at least one recess on a bottom surface close to the hinge to improve the force of binding between the mesh/mesh fabric in the recess and the door cover. The recess is configured to extend parallel to the hinge. The recess is a continuously extending wave groove. The recess may comprise discrete semi-circular arc segments. The minimum distance of the recess from the hinge is 3 to 5 mm. The door cover may comprise at least a first region located close to the hinge and a second region located away from the hinge. The mesh/mesh fabric connected on the door cover may comprise sectionalized weft densities. The mesh/mesh fabric connected on the door cover may comprise a first region located close to the hinge and a second region located away from the hinge, the mesh/mesh fabric of the first region having a first weft density and the mesh/mesh fabric of the second region having a second weft density and the first weft density is less than the second weft density. The first weft density is equal to or less than 3 threads per 10 mm. The second weft density is 5 to 7 threads per 10 mm. The door cover may comprise at least one rib/rib structure. The rib/rib structure is formed on a bottom surface close to the hinge. The rib/rib structure is located in the first region. The distance between the rib/rib structure and the hinge is 10 to 30 mm. The mesh/mesh fabric is connected to the side panel and may comprise at least one ring to facilitate absorption of airbag impact energy. The mesh/mesh fabric is connected to the side panel and may comprise a first ring and a second ring connected in series with the first ring to facilitate absorption of airbag impact energy. The mesh/mesh fabric is connected to the framework/frame by inserted injection molding; a part of resin permeates through the mesh/mesh fabric during the inserted injection molding to form at least one reinforcing rib at an outer surface of the mesh/mesh fabric corresponding to the recess to improve the force of binding between the mesh/mesh fabric and the door cover. The door cover is provided with a first rib/rib structure formed on a bottom surface close to the hinge; the recess is between the hinge and the first rib/rib structure so as to improve the force of binding between the mesh/mesh fabric in the recess and the door cover. The door cover is provided with a first rib/rib structure formed on a bottom surface close to the hinge and the recess is located between the hinge and the first rib/rib structure to limit the mesh/mesh fabric located at the first rib/rib structure to a bottom of the first rib/rib structure. The mesh/mesh fabric is connected to the framework/frame by inserted injection molding; a part of resin permeates through the mesh/mesh fabric during the inserted injection molding to form a reinforcing rib at an outer surface of the mesh/mesh fabric corresponding to the recess to improve the force of binding between the mesh/mesh fabric and the door cover.

According to an exemplary embodiment as shown schematically in FIGS. 1A-1C, 2A-2B, 3, 4, 5, 6A-6B, 7, 8, 8A-8C and 9A-9B, a method for manufacturing a vehicle interior component for a vehicle interior component comprising an instrument panel with an airbag door structure may comprise the steps of forming a framework/frame, a door cover, at least one reinforcing rib and a recess and connecting mesh/mesh fabric to the framework/frame by inserted injection molding; a part of resin may permeate through the mesh/mesh fabric during the inserted injection molding to form a reinforcing rib at an outer surface of the mesh/mesh fabric corresponding to the recess to improve the force of binding between the mesh/mesh fabric and the door cover. The mesh/mesh fabric is formed on a side panel of the framework/frame. The mesh/mesh fabric may comprise a first ring and a second ring connected in series by inserted injection molding of both rings of the mesh/mesh fabric.

According to an exemplary embodiment as shown schematically in FIGS. 1A-1C, 2A-2B, 3, 4, 5, 6A-6B, 7, 8, 8A-8C and 9A-9B, a component for a vehicle interior configured to facilitate deployment of an airbag may comprise a composite structure comprising an injection molded structure/framework with a mesh insert/fabric within a panel and a door panel. The structure may comprise a feature configured to retain the mesh insert. The feature may comprise a set of ribs formed into the mesh insert. A resin feature may comprise a reinforcing rib adjacent to the recess to facilitate binding between the mesh fabric and the door panel. The door panel may comprise a recess provided between the hinge area and the feature to facilitate bonding of the mesh insert. The feature may comprise a rib formed into the mesh insert at the recess. The mesh may comprise a set of rings configured to facilitate absorption of energy during deployment of the airbag.

Exemplary Embodiments—B

According to an exemplary embodiment as shown schematically in the FIGURES, a vehicle interior component may comprise an airbag door structure comprising mesh fabric connected and fixed on an inner side of a framework facing an airbag; the framework may comprise a door cover and a side panel connected by a hinge, the door cover is provided with a first pressing rib and at least one recess formed in the bottom surface of the door cover close to the hinge; the recess is located between the hinge and the first pressing rib so as to improve the force of binding between the mesh fabric in the recess and the door cover and limit the mesh fabric located at the first pressing rib to a bottom of the first pressing rib; the mesh fabric connected to the side panel is provided with a first lifting ring and a second lifting ring connected in series, so as to facilitate absorption of airbag impact energy by inserted injection molding of both lifting rings mesh fabric. The recess is configured to extend parallel to the hinge. The recess may comprise a continuously extending wave groove and/or discrete semi-circular arc segments. The minimum distance of the recess from the hinge is configured to be 3 to 5 mm and a distance of the first pressing rib from the hinge is configured to be 10 to 30 mm. The mesh fabric connected on the door cover may comprise sectionalized weft densities. The mesh fabric connected on the door cover may comprise a first region located close to the hinge and a second region located away from the hinge, the mesh fabric of the first region having a first weft density and the mesh fabric of the second region having a second weft density and the first weft density is less than the second weft density. The first weft density is equal to or less than 3 threads per 10 mm. The second weft density is 5 to 7 threads per 10 mm. The door cover may comprise a first pressing rib located in the first region. The mesh fabric is connected to the framework by inserted injection molding and a part of resin permeates through the mesh fabric during the inserted injection molding, thereby forming a reinforcing rib at an outer surface of the mesh fabric corresponding to the recess to improve the force of binding between the mesh fabric and the door cover.

According to an exemplary embodiment as shown schematically in the FIGURES, a vehicle interior component may comprise an instrument panel on which an airbag door structure is mounted and a mesh fabric is connected and fixed on an inner side of a framework facing an airbag; the framework comprising a door cover and a side panel connected by a hinge; the door cover forms at least one recess on a bottom surface close to the hinge to improve the force of binding between the mesh fabric in the recess and the door cover. The recess is configured to extend parallel to the hinge. The recess is a continuously extending wave groove.

The recess may comprise discrete semi-circular arc segments. The minimum distance of the recess from the hinge is 3 to 5 mm. The door cover may comprise at least a first region located close to the hinge and a second region located away from the hinge. The mesh fabric connected on the door cover may comprise sectionalized weft densities. The mesh fabric connected on the door cover may comprise a first region located close to the hinge and a second region located away from the hinge, the mesh fabric of the first region having a first weft density and the mesh fabric of the second region having a second weft density and the first weft density is less than the second weft density. The first weft density is equal to or less than 3 threads per 10 mm. The second weft density is 5 to 7 threads per 10 mm. The door cover may comprise at least one pressing rib. The pressing rib is formed on a bottom surface close to the hinge. The pressing rib is located in the first region. The distance between the pressing rib and the hinge is 10 to 30 mm. The mesh fabric is connected to the side panel and may comprise at least one lifting ring to facilitate absorption of airbag impact energy. The mesh fabric is connected to the side panel and may comprise a first lifting ring and a second lifting ring connected in series with the first lifting ring to facilitate absorption of airbag impact energy. The mesh fabric is connected to the framework by inserted injection molding; a part of resin permeates through the mesh fabric during the inserted injection molding to form at least one reinforcing rib at an outer surface of the mesh fabric corresponding to the recess to improve the force of binding between the mesh fabric and the door cover. The door cover is provided with a first pressing rib formed on a bottom surface close to the hinge; the recess is between the hinge and the first pressing rib so as to improve the force of binding between the mesh fabric in the recess and the door cover. The door cover is provided with a first pressing rib formed on a bottom surface close to the hinge and the recess is located between the hinge and the first pressing rib to limit the mesh fabric located at the first pressing rib to a bottom of the first pressing rib. The mesh fabric is connected to the framework by inserted injection molding; a part of resin permeates through the mesh fabric during the inserted injection molding to form a reinforcing rib at an outer surface of the mesh fabric corresponding to the recess to improve the force of binding between the mesh fabric and the door cover.

According to an exemplary embodiment as shown schematically in the FIGURES, a method for manufacturing a vehicle interior component for a vehicle interior component comprising an instrument panel with an airbag door structure may comprise the steps of forming a framework, a door cover, at least one reinforcing rib and a recess and connecting mesh fabric to the framework by inserted injection molding; a part of resin may permeate through the mesh fabric during the inserted injection molding to form a reinforcing rib at an outer surface of the mesh fabric corresponding to the recess to improve the force of binding between the mesh fabric and the door cover. The mesh fabric is formed on a side panel of the framework. The mesh fabric may comprise a first lifting ring and a second lifting ring connected in series by inserted injection molding of both lifting rings mesh fabric.

According to an exemplary embodiment as shown schematically in the FIGURES, a vehicle interior component may comprise an airbag door structure; mesh fabric is connected and fixed on the inner side of a framework facing an airbag; the framework comprises a door cover and a side panel which are connected by a hinge; the door cover is provided with a first pressing rib, and at least one recess formed in the bottom surface of the door cover close to the hinge; the recess is located between the hinge and the first pressing rib so as to improve the force of binding between the mesh fabric in the recess and the door cover and limit the mesh fabric located at the first pressing rib to the bottom of the first pressing rib; the mesh fabric connected to the side panel is provided with a first lifting ring and a second lifting ring which are connected in series, so as to facilitate absorption of airbag impact energy by inserted injection molding of the double-lifting-ring mesh fabric.

According to an exemplary embodiment as shown in the FIGURES, the airbag door structure comprises a mesh fabric connected and fixed on an inner side of a framework facing an airbag; the framework comprising a door cover and a side panel which are connected by a hinge, the door cover may be provided with a first pressing rib, and at least one recess formed in the bottom surface of the door cover close to the hinge; the recess being located between the hinge and the first pressing rib so as to improve the force of binding between the mesh fabric in the recess and the door cover and limit the mesh fabric located at the first pressing rib to a bottom of the first pressing rib; the mesh fabric connected to the side panel may be provided with a first lifting ring and a second lifting ring which are connected in series, so as to facilitate absorption of airbag impact energy by inserted injection molding of the double-lifting-ring mesh fabric. The recess may extend parallel to the hinge. The recess may be a continuously extending wave groove or may be provided by discrete semi-circular arc segments. According to an exemplary embodiment, a minimum distance of the recess from the hinge may be set to 3 to 5 mm, and a distance of the first pressing rib from the hinge may be set to 10 to 30 mm. The mesh fabric connected on the door cover may have a weft density adjusted in segment. The mesh fabric connected on the door cover comprises a first region close to the hinge and a second region away from the hinge, the mesh fabric of the first region having a first weft density and the mesh fabric of the second region having a second weft density, the first weft density being less than the second weft density. The first weft density may be 3 threads per 10 mm or less. The second weft density may be 5 to 7 threads per 10 mm. The door cover may be provided with a first pressing rib located in the first region. The mesh fabric may be connected to the framework by inserted injection molding, and a part of resin penetrates through the mesh fabric during the inserted injection molding, thereby forming a reinforcing rib at an outer surface of the mesh fabric corresponding to the recess to improve the force of binding between the mesh fabric and the door cover. A vehicle interior component according to the invention comprises an instrument panel on which an airbag door structure may be mounted, a mesh fabric may be connected and fixed on an inner side of a framework facing an airbag; the framework comprising a door cover and a side panel which are connected by a hinge, the door cover forms at least one recess on a bottom surface close to the hinge to improve the force of binding between the mesh fabric in the recess and the door cover. The recess may extend parallel to the hinge. The recess may be a continuously extending wave groove. The recess may be provided by discrete semi-circular arc segments. According to an exemplary embodiment, a minimum distance of the recess from the hinge may be 3 to 5 mm. The door cover may comprise at least a first region close to the hinge and a second region away from the hinge. The mesh fabric connected on the door cover may have a weft density adjusted in segment. The mesh fabric connected on the door cover may comprise a first region close to the hinge and a second region away from the hinge, the mesh fabric of the first region having a first weft density and the mesh fabric of the second region having a second weft density, the first weft density being less than the second weft density. The first weft density may be 3 threads per 10 mm or less. The second weft density may be 5 to 7 threads per 10 mm. The door cover may have at least one rib; the rib may comprise a pressing rib. The rib may be formed on a bottom surface close to the hinge. The rib may be located in the first region. According to an exemplary embodiment, a distance between the rib and the hinge may be 10 to 30 mm. The mesh fabric may be connected to the side panel and may have at least one lifting ring to facilitate absorption of airbag impact energy. The mesh fabric may be connected to the side panel and may have a first lifting ring and a second lifting ring in series with the first lifting ring to facilitate absorption of airbag impact energy. The mesh fabric may be connected to the framework injection molding; part of resin penetrates through the mesh fabric during the inserted injection molding to form at least one reinforcing rib at an outer surface of the mesh fabric corresponding to the recess to improve the force of binding between the mesh fabric and the door cover. The door cover may be provided with a first pressing rib formed on a bottom surface close to the hinge, and the recess may be between the hinge and the first pressing rib so as to improve the force of binding between the mesh fabric in the recess and the door cover. The door cover may be provided with a first pressing rib formed on a bottom surface close to the hinge, and the recess may be between the hinge and the first pressing rib to limit the mesh fabric located at the first pressing rib to a bottom of the first pressing rib. The mesh fabric may be connected to the framework by injection molding, and a part of resin penetrates through the mesh fabric during the injection molding, to form a reinforcing rib at an outer surface of the mesh fabric corresponding to the recess to improve the force of binding between the mesh fabric and the door cover.

According an exemplary embodiment as shown in the FIGURES, a method for manufacturing a vehicle interior component comprising an instrument panel with an airbag door structure may be mounted may comprise the steps of forming a framework, a door cover, at least one reinforcing rib and a recess; connecting a mesh fabric to the framework by injection molding; providing a resin to project into the mesh fabric to form a reinforcing rib at an outer surface of the mesh fabric at the recess to improve binding between the mesh fabric and the door cover. The mesh fabric may be formed on a side panel of the framework. The mesh fabric may be inserted injection molded from a double-lifting-ring mesh fabric having a first lifting ring and a second lifting ring in series.

According an exemplary embodiment as shown in the FIGURES, the airbag door structure may comprise assembly through the recess on the door cover and the inserted injection molding of the double-lifting-ring mesh fabric to avoid the detachment of the mesh fabric from the airbag door during deployment as possible to improve the safety factor of ignition and a first-pass yield, to save the development cost, and to save the experimental cost of batch ignition, to solve an ignition problem of the airbag door without increasing the cost for the instrument panel ignition pass.

According to an exemplary embodiment as shown in the FIGURES, a component for a vehicle interior such as an instrument panel may be configured to facilitate deployment of an airbag from an airbag module. The component may comprise an airbag door structure comprising an embedded inserted injection molding structure of a mesh fabric and a framework. The component may comprise an airbag door structure comprising an embedded inserted injection molding structure of a mesh fabric and a framework to provide reduced cost. The component may comprise an airbag door structure comprising an embedded inserted injection molding structure of a mesh fabric and a framework to overcome problems of poor combination of the mesh fabric and the airbag door such as cracking/breaking of the mesh fabric and/or structure/border of the airbag door during deployment and/or failure point of detachment between an airbag door cover and a mesh fabric. The component may reduce the possibility of ignition/deterioration at deployment. The component may provide improved energy-absorption to ensure the integrity of the airbag door cover and safety margin at deployment.

Figure 4:
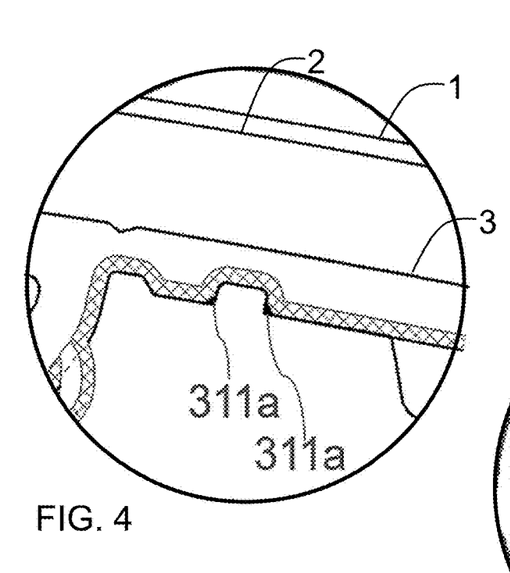
FIG. 4 is an enlarged schematic view of a region of the airbag door structure with framework and mesh fabric according to an exemplary embodiment.
Figure 8:
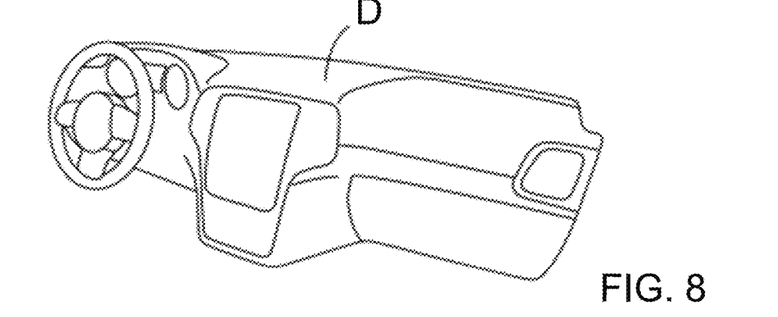
FIG. 8 is a schematic view of a component shown as an instrument panel providing an airbag door structure according to an exemplary embodiment.
Figure 8A:
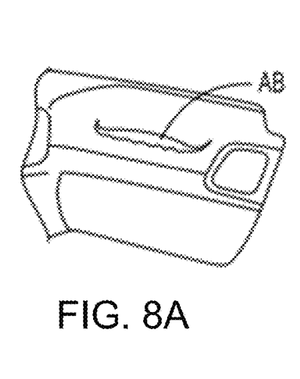
FIGS. 8A through 8C are schematic views of a component shown as an instrument panel providing an airbag door structure during deployment of an airbag according to an exemplary embodiment.
Figure 8B:
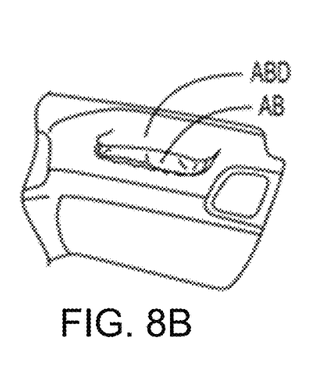
Figure 8C:
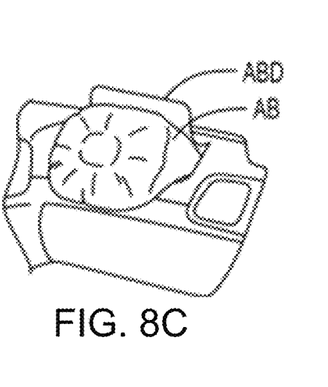
Figure 9B:
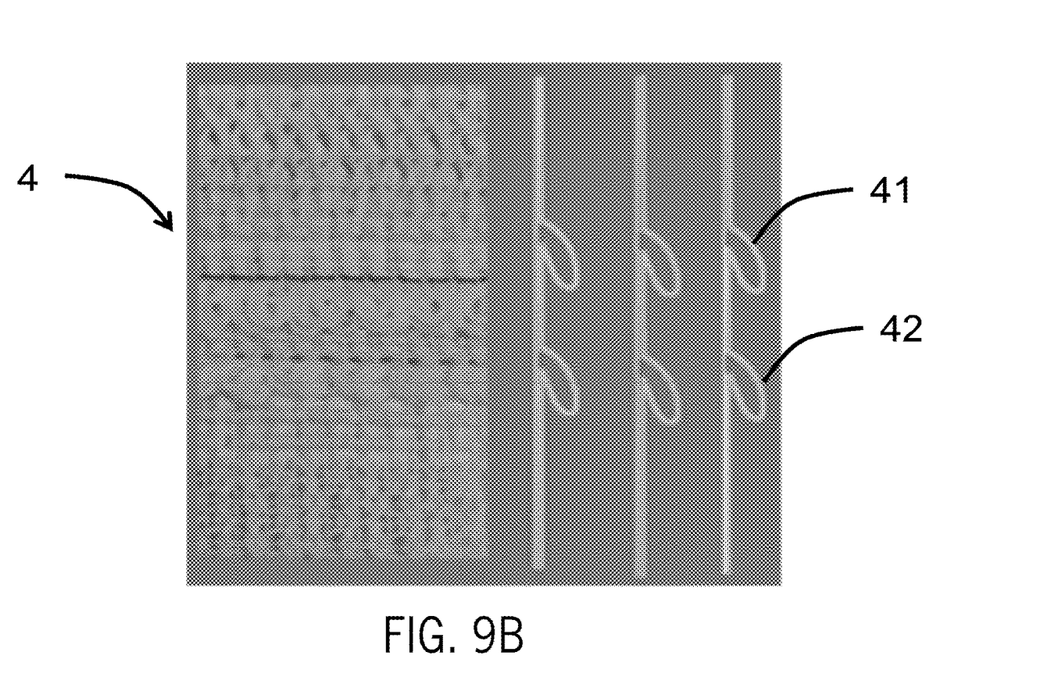
FIG. 9B is a detailed schematic view of mesh fabric for the airbag door structure with framework according to an exemplary embodiment.

As indicated schematically in the FIGURES, FIG. 1B illustrates schematically a mounting position on an instrument panel of the airbag door structure of FIG. 1A; FIG. 1C is a partial exploded schematic view of the instrument panel of FIG. 1B; FIG. 2A is a schematic view of the structure of FIG. 1C after the framework and mesh fabric are connected; FIG. 2B is a cross-sectional schematic view along line A-A of FIG. 2A;

FIG. 3 is a bottom schematic view of the cover panel of FIG. 2B; FIG. 4 is an enlarged schematic view of region B of FIG. 2B; FIG. 5 is an enlarged schematic view of region C of FIG. 2B; FIG. 6 is a bottom schematic view of the cover panel region of FIG. 2B; FIGS. 6A-6B and 7 are bottom schematic views of the cover panel region (including the recess) of FIG. 2B. FIG. 8 is a schematic view of a component shown as an instrument panel providing an airbag door structure; FIGS. 8A through 8C are schematic views of a component shown as an instrument panel providing an airbag door structure during deployment of an airbag. FIG. 9A is a schematic view of a cover panel with mesh fabric for the airbag door structure with framework; FIG. 9B is a detailed schematic view of mesh fabric for the airbag door structure with framework.

TABLE A

REFERENCE SYMBOL LIST

| REFERENCE SYMBOL | ELEMENT, PART OR COMPONENT |
|---|---|
| V | Vehicle |
| I | Interior |
| D | Component (e.g. instrument panel) |
| AB | Airbag |
| ABD | Airbag door |
| 1 | Cover/skin layer |
| 2 | Intermediate/foam layer |
| 3 | Composite structure/structure (e.g. frame/framework, door structure) |
| 31 | Door panel (cover) |
| 311 | Recess |
| 311a | Feature (e.g. corner, etc.) |
| 312 | Rib (e.g. pressed/pressing rib for recess) |
| 313 | Rib (e.g. pressed/pressing rib for recess) |
| 32 | Base panel |
| 33 | Hinge/hinge area |
| B/C | Region |
| 4 | Mesh/mesh fabric |
| 4a | Web/region |
| 41 | Ring/loop (e.g. lifting ring) |
| 41a | Thread |
| 412 | Rib (e.g. reinforcement, structure/rib) |
| 413 | Rib (e.g. reinforcement, structure/rib) |
| 42 | Ring/loop (e.g. lifting ring) |

TABLE A-continued

REFERENCE SYMBOL LIST

| REFERENCE SYMBOL | ELEMENT, PART OR COMPONENT |
|---|---|
| 42a | Thread |
| 43 | Region/zone |
| 44 | Region/zone |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to facilitate deployment of an airbag through an opening comprising:
a composite structure comprising a base panel and a door panel and a mesh;
wherein the composite structure is configured to provide a hinge area between the base panel and the door panel;
wherein the composite structure is configured to facilitate deployment of the airbag to form the opening at the door panel;
wherein the composite structure comprises an injection molded structure comprising the base panel and the door panel;
wherein the mesh comprises a mesh insert provided in the injection molded structure;
wherein the composite structure comprises a feature configured to retain the mesh insert within the composite structure;
wherein the feature comprises a set of ribs formed into the mesh insert;
wherein the mesh comprises a set of rings at the base panel configured to facilitate absorption of energy during deployment of the airbag.

2. The component of claim 1 wherein the mesh comprises a mesh insert within the base panel and the door panel.

3. The component of claim 1 wherein the mesh insert comprises a mesh fabric.

4. The component of claim 1 wherein the injection molded structure comprises a framework.

5. The component of claim 1 wherein the hinge area comprises the mesh insert.

6. The component of claim 1 wherein the feature comprises a rib.

7. The component of claim 6 wherein the rib comprises a set of ribs and/or a formed rib and/or a set of formed ribs.

8. The component of claim 1 wherein the mesh insert comprises a mesh fabric; wherein the feature comprises a resin feature formed through the mesh fabric during injection molding of the composite structure; wherein the resin feature comprises a reinforcing rib at an outer surface of the mesh fabric adjacent to a recess to facilitate binding between the mesh fabric and the door panel.

9. The component of claim 1 wherein the door panel comprises a recess provided between the hinge area and the feature to facilitate bonding of the mesh insert at the recess.

10. The component of claim 9 wherein the feature comprises at least one rib formed into the mesh insert at the recess.

11. The component of claim 9 wherein the recess is configured to extend parallel to the hinge area and/or the recess comprises a wave-shaped recess.

12. The component of claim 1 wherein the set of rings at the base panel configured to facilitate absorption of energy during deployment of the airbag comprises a first lifting ring and a second lifting ring.

13. The component of claim 1 wherein the set of rings comprises a set of threaded rings in series.

14. The component of claim 1 wherein the mesh insert comprises a mesh fabric comprising a first region adjacent to the hinge area and a second region located apart from the hinge area; wherein the mesh fabric at the first region comprises a first weft density and the mesh fabric at the second region comprises a second weft density; wherein the first weft density is less than the second weft density.

15. The component of claim 1 wherein the mesh insert comprises a mesh fabric; wherein the composite structure comprises a resin feature formed through the mesh fabric during injection molding of resin to form the injection molded structure of the composite structure; wherein the resin feature comprises a reinforcing rib at an outer surface of the mesh fabric adjacent to a recess to facilitate bonding between the mesh fabric and the door panel.

16. The component of claim 15 wherein the mesh fabric is provided within the base panel; wherein the base panel comprises a set of features to facilitate bonding between the mesh fabric and the base panel.

17. A component for a vehicle interior configured to facilitate deployment of an airbag through an opening comprising:
- a composite structure comprising a base panel and a door panel and a mesh;
- wherein the composite structure is configured to provide a hinge area between the base panel and the door panel;
- wherein the composite structure is configured to facilitate deployment of the airbag to form the opening at the door panel;
- wherein the composite structure comprises an injection molded structure comprising the base panel and the door panel;
- wherein the mesh comprises a mesh insert provided in the injection molded structure;
- wherein the mesh insert comprises a mesh fabric comprising a first region adjacent to the hinge area and a second region located apart from the hinge area;
- wherein the mesh fabric at the first region comprises a first density and the mesh fabric at the second region comprises a second density;
- wherein the first density at the first region of the mesh fabric is less than the second density at the second region of the mesh fabric.

18. The component of claim 17 wherein the composite structure comprises a feature configured to retain the mesh insert within the composite structure.

19. The component of claim 18 wherein the feature comprises a set of ribs formed into the mesh insert.

20. The component of claim 17 wherein the mesh comprises a set of rings at the base panel configured to facilitate absorption of energy during deployment of the airbag.

* * * * *